Figure 1:
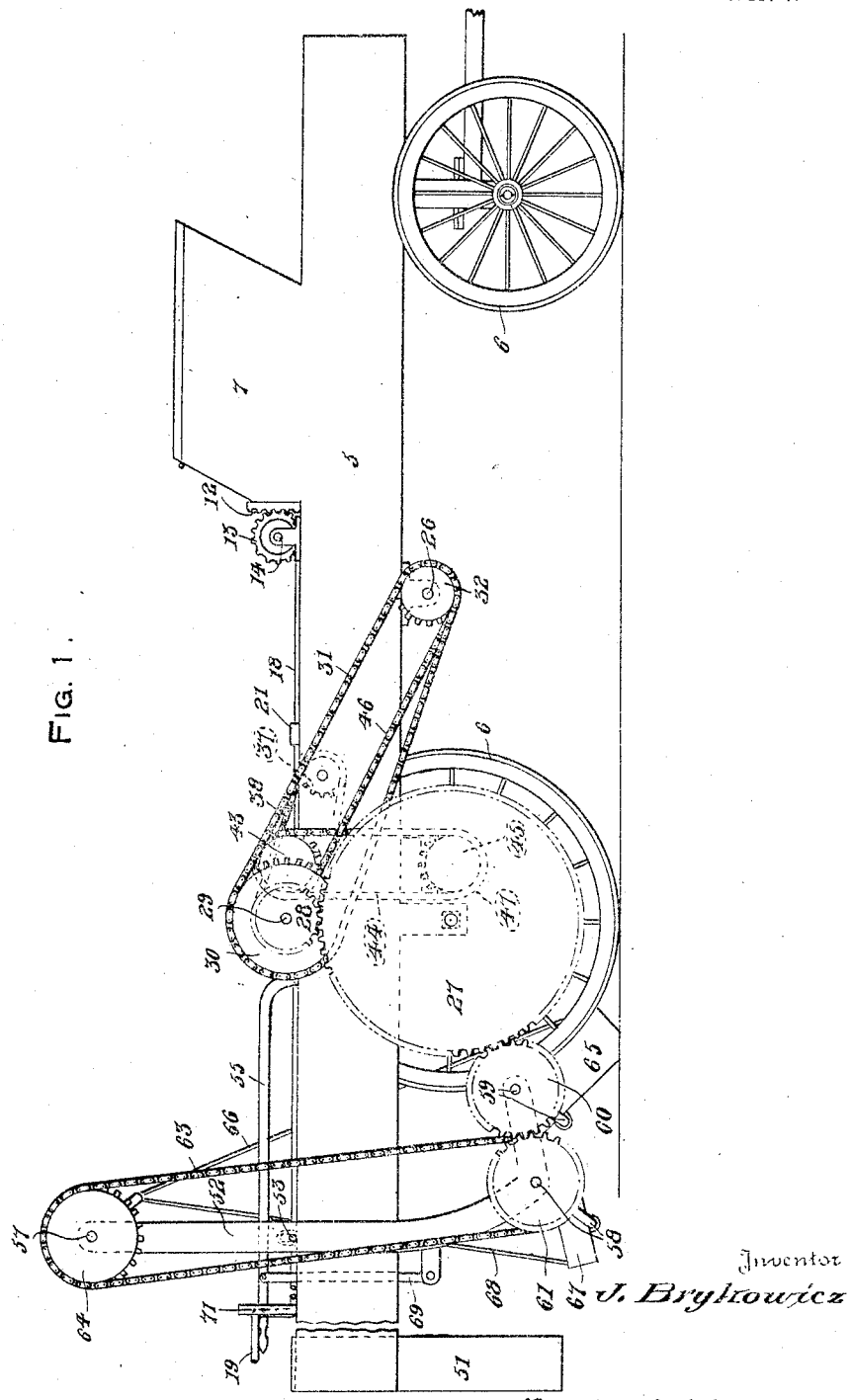

J. BRYKOWICZ.
POTATO PLANTER.
APPLICATION FILED AUG. 21, 1919.

1,364,914.

Patented Jan. 11, 1921.
4 SHEETS—SHEET 1.

Inventor
J. Brykowicz
By N. M. Wilson
Attorney

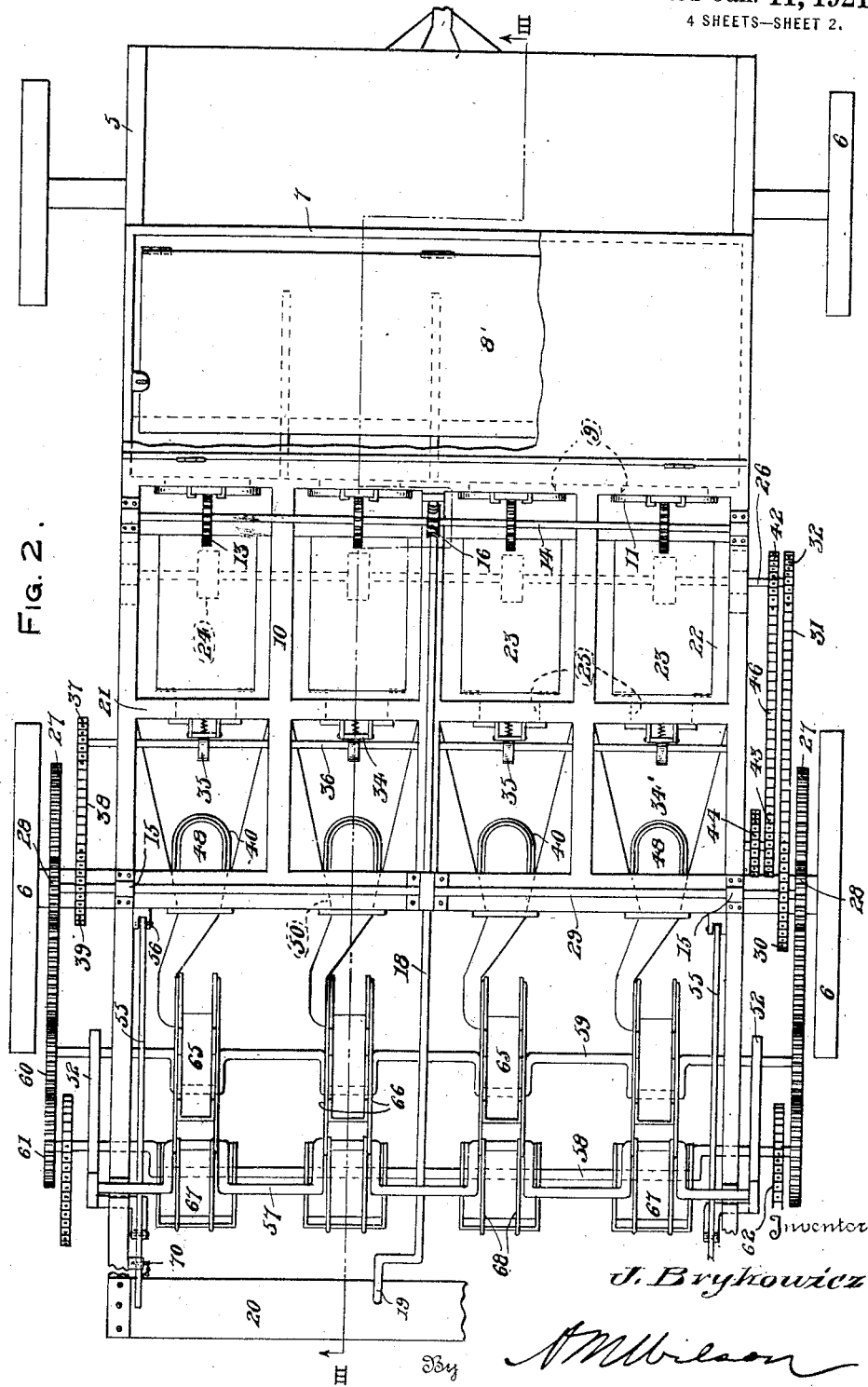

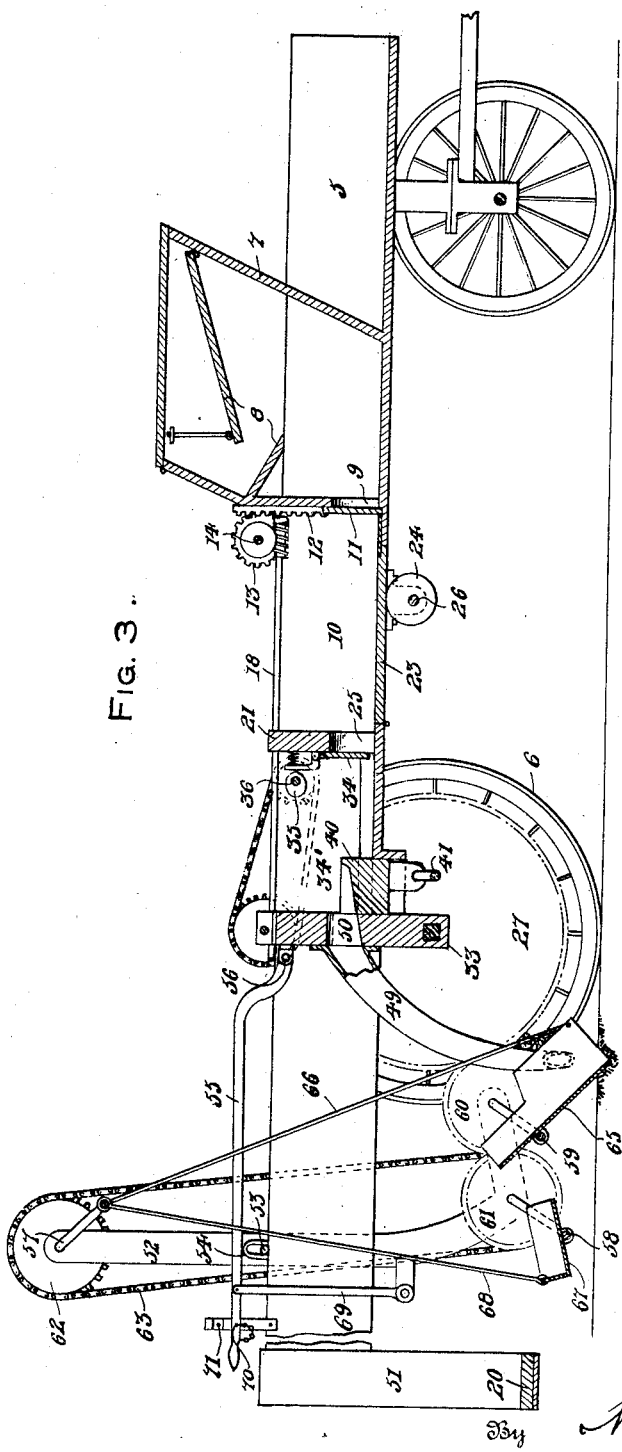

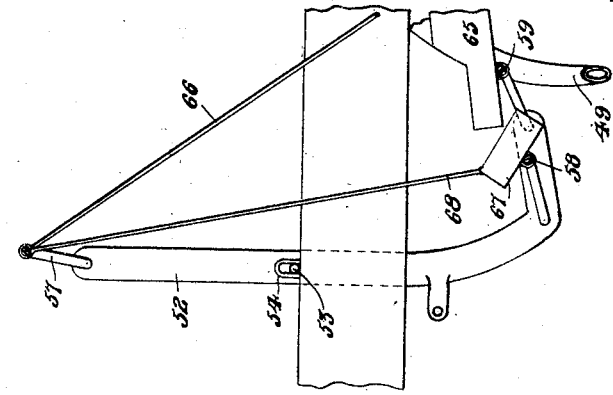
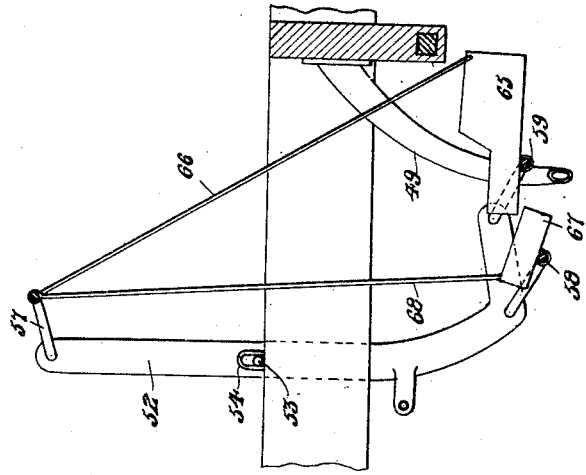
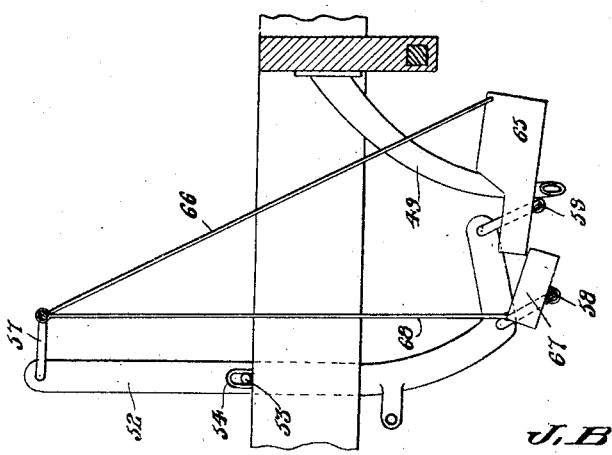

UNITED STATES PATENT OFFICE.

JOHN BRYKOWICZ, OF EDMONTON, ALBERTA, CANADA.

POTATO-PLANTER.

1,364,914.　　　Specification of Letters Patent.　　Patented Jan. 11, 1921.

Application filed August 21, 1919. Serial No. 318,905.

*To all whom it may concern:*

Be it known that I, JOHN BRYKOWICZ, a citizen of Ukraine, residing at Edmonton, in the Province of Alberta and Dominion of Canada, have invented certain new and useful Improvements in Potato-Planters, of which the following is a specification.

This invention relates to certain new and useful improvements in potato planters specifically designed to substantially continuously feed potatoes from a hopper to furrows in the ground previously prepared by improved digging devices, which furrows are subsequently filled in, to cover the planted potatoes, with the earth removed in forming the furrows.

The primary object of this invention is the provision of a potato planter having novel means for forming short furrows in rapid succession for reception of potatoes to be planted, means also being provided to fill these furrows for covering the potatoes.

With the above general objects in view and others that will become apparent as the nature of the invention is better understood, the same consists in the novel form, combination and arrangement of parts hereinafter more fully described, shown in the accompanying drawings and claimed.

In the drawings,

Figure 1 is a side elevational view, partly broken away, of a potato planter constructed in accordance with the present invention, Fig. 2 is a top plan view of the device shown in Fig. 1 with parts broken away, Fig. 3 is a longitudinal sectional view taken substantially upon line III—III of Fig. 2, Fig. 4 is a fragmentary detail view showing the furrow digging and filling devices in one position wherein the potato feeding tubes are uncovered after the furrows have been formed.

Fig. 5 is a view similar to Fig. 4 with the furrow digging and filling devices further advanced in their operation at a point wherein the furrow filling device is about to receive the earth from the digging device, Fig. 6 is a view similar to Fig. 4 with the furrow digging and filling devices in a still further advanced position wherein the earth has been transferred to the furrow filling device subsequent to the dumping of the earth into the furrow.

Referring to the drawings in detail, the present invention embodies a vehicle including a body 5 mounted upon supporting wheels 6 and having a hopper 7 adjacent the forward end thereof. The hopper 7 is provided with inclined plates 8 which form runways down which the potatoes move toward the discharge openings 9 formed at suitable intervals in the rear wall of the hopper 7, partitions 10 being provided longitudinally of the body 5 in parallel spaced relation between the openings 9. A plurality of gates 11 are arranged to close the openings 9 and are mounted for vertical movement so that the same may be raised for uncovering said openings. The gates 11 are provided with vertically disposed racks 12 meshing with spur gears 13 which are secured upon the transverse shaft 14 mounted for rotation in the bearings 15 which are secured upon the upper edges of the sides of the body 5. A worm gear 16 is also secured upon the shaft 14 centrally of the latter and meshes with a worm 17 upon the forward end of a shaft 18 which is mounted for rotation longitudinally of the vehicle and has a handle 19 upon the rear end thereof within convenient reach of the operator standing upon the platform 20 provided at the extreme rear end of the vehicle. It is obvious that rotation of the shaft 18 will cause movement of the gates 11 for opening or closing the openings 9 as desired for regulating the outward flow of the potatoes.

A partition 21 is arranged transversely of the body 5 rearwardly of the gates 11 and intersecting the longitudinal partitions 10 so as to provide a plurality of compartments 22 into which the potatoes move from the hopper 7. The bottoms of the compartments 22 are in the form of vertically movable hinged plates 23, which plates 23 are vibrated in a vertical direction by engagement of the cams 24 with the under faces thereof for insuring movement of the potatoes rearwardly through the openings 25 provided in the partition 21. The cams 24 are secured on a transverse shaft 26 which is journaled beneath the plates 23 and rotated in a manner which will presently become apparent.

The rear supporting wheels have large spur gears 27 fastened upon the hubs thereof so as to rotate therewith, and these gears 27 mesh with smaller gears 28 which are fastened upon the ends of a transverse shaft 29 which is journaled above the gear 27. A sprocket wheel 30 is fastened upon the shaft 9 adjacent one of the spur gears 28 and has a sprocket chain 31 passed therearound, said sprocket chain also passing around a sprocket wheel 32 fastened upon the adjacent end of the transverse shaft 26. It will thus be seen that upon forward movement of the vehicle the gear 27 will rotate gear 28 and sprocket wheel 30, thus causing movement of the chain 31 to rotate sprocket wheel 32 together with the cams 24 and shaft 26.

The body 5 has an end wall 33 spaced from the partition 21 and connecting with the partitions 10 to provide a row of rear compartments 34' into which the potatoes are moved through the openings 25 by means of the vibrating plates 23.

The openings 25 are normally closed by the spring actuated gates 34 and said gates are intermittently opened by means of the cams 35 as will presently become apparent. The cams 35 are secured on a transverse rotatable shaft 36 having a sprocket wheel 37 secured on one end thereof and rotated by passing a chain 38 around this sprocket wheel as well as around sprocket wheel 39 fastened on the adjacent end of the shaft 29.

Potato elevating and discharging members 40 are slidably positioned through the bottoms of the compartments 34' for vertical movement, and these elevating and discharging members are reciprocated through the instrumentality of a rotatable crank shaft 41 which is operatively connected by sprocket wheels 42, 43, 44 and 45 and sprocket chains 46 and 47 with the rotatable shaft 26. As will be seen by reference to Fig. 3, the cams 35 open the gates 34 when the members 40 are lowered so that the potatoes may roll into the pockets 48 of the latter, and the cams 35 release the gates 34 so that the same close when the members 40 are raised to the position shown in Fig. 3 wherein the potatoes may roll from the pockets 48 into the delivery tubes 49 which are rigidly fastened to the end wall 33 coincident with the apertures 50 provided through the latter.

The sides of the body 5 extend rearwardly to a point beyond the end wall 33 and have the ends of a U-shaped strap 51 fastened thereto so that said U-shaped strap depends with its base in a substantially horizontal position between said sides of the body, the platform 20 being suitably fastened on the base of this U-shaped strap.

A frame 52 is arranged upright adjacent each side of the body 5 between the end wall 33 and the platform 20, and these frames are provided with inwardly projecting pins 53 which extend into the vertically elongated eyes 54 which are carried by the sides of the body to guide the frames in their vertical movement when the same are raised or lowered by means of the levers 55 which are pivoted as at 56 to the end 33 of the body. The frames 52 are of substantially L-shape and have a transverse crank shaft 57 journaled in the upper ends thereof and also a pair of crank shafts 58 and 59 journaled in spaced relation in the lower ends thereof. A gear 60 is fastened upon each end of the crank shaft 59 in mesh with the gears 27 and also in mesh with gears 61 fastened upon the ends of the crank shaft 58. The crank shaft 58 has sprocket wheels 62 fastened thereon, and chains 63 pass around these sprocket wheels and also around the sprocket wheels 64 which are fastened upon the ends of the crank shaft 57. It will thus be seen that rotation will be imparted from the gears 27 to the crank shafts 57, 58 and 59.

A plurality of channel-shaped digging members 65 are pivotally mounted upon the cranks of the shaft 59 and the forward ends of these digging members are connected by links 66 to the cranks of the shaft 57. Earth receiving and furrow filling scoops 67 are similarly pivoted upon the cranks of the shaft 58 rearwardly of the digging or furrow forming members 65 and have their rear ends connected to the cranks of the shaft 57 by links 68. As shown in Figs. 3 and 4 to 6 inclusive, the cranks of the shafts 57, 58 and 59 are so relatively disposed and timed in operation as to cause the members 65 to enter the ground and form a furrow by removing a small quantity of earth after which the forward ends of the members 65 are swung upward to dump the earth into the scoop 67 when moved from the position of Fig. 5 to the position of Fig. 6. In Fig. 6 the earth has been received by the scoop 67 which is arranged at an inclination so as to dump the dirt into the furrow and cover the potato that has been allowed to pass out of the tube 49, it being noted that when the device 65 is in its digging position of Fig. 3, one side of the latter is arranged to close the open lower end of the tube 49 so as to prevent passage of the potatoes out of the tube 49 until the furrow has been formed.

The hand levers 55 are connected to the frames 52 by links 69 so that when said hand levers are raised, the frames are also raised to regulate the depth of furrow cut by the members 65, suitable pins 70 being carried by the hand levers and adapted for positioning through the levers and the brackets 71 so as to retain the frames in their adjusted positions.

From the foregoing description it is believed that the construction and operation of the present invention will be readily understood by those skilled in the art.

While the form of the invention herein shown and described is what is believed to by the preferable embodiment thereof, it is nevertheless to be understood that minor changes may be made in the form, combination and arrangement of parts without departing from the spirit and scope of the invention as claimed.

What I claim as new is:—

1. In a potato planter, a depending potato conveying tube, and intermittent furrow forming means including a pivotally mounted channel-shaped digging member positioned to close the delivery end of said tube when forming a furrow and movable to uncover the delivery end of said tube after the furrow has been formed.

2. In a potato planter, a pair of crank shafts having channel-shaped furrow forming members and furrow filling scoops pivoted on the cranks thereof, a third crank shaft above said pair of crank shafts, links connecting the cranks of the last named shaft to the forward ends of said furrow forming members and to the rear ends of said furrow filling scoops, and means to simultaneously rotate said crank shafts for causing said furrow forming members to intermittently form furrows and to deliver earth to said scoops and to tilt the scoops to deliver earth into the furrows.

3. In a potato planter, a pair of crank shafts having channel-shaped furrow forming members and furrow filling scoops pivoted on the cranks thereof, a third crank shaft above said pair of crank shafts, links connecting the cranks of the last named shaft to the forward ends of said furrow forming members and to the rear ends of said furrow filling scoops, means to simultaneously rotate said crank shafts for causing said furrow forming members to intermittently form furrows and to deliver earth to said scoops and to tilt the scoops to deliver earth into the furrows, a pair of vertically movable frames in which said shafts are journaled, and manually operable means to vertically move said frames for regulating the depth of furrows formed by said furrow forming members.

In testimony whereof I affix my signature.

JOHN BRYKOWICZ.